United States Patent

Chisholm et al.

[11] Patent Number: 6,066,694
[45] Date of Patent: May 23, 2000

[54] POLYESTER MOLDING COMPOSITION

[75] Inventors: Bret Ja Chisholm; Robert R. Gallucci, both of Mt. Vernon; William P. England, Evansville; Patricia A. Hubbard, Mt. Vernon, all of Ind.; William D. Richards, Scotia, N.Y.; Jenny Z. Bu, Evansville, Ind.

[73] Assignee: General Electric Company, Pittsfield, Mass.

[21] Appl. No.: 09/034,747

[22] Filed: Mar. 4, 1998

[51] Int. Cl.⁷ .............................. C08L 67/02; C08L 69/00
[52] U.S. Cl. ............................. 525/67; 525/68; 525/133; 525/439; 525/444; 524/147; 528/294; 528/295
[58] Field of Search ........................ 525/444, 439, 525/67, 68, 133; 528/294, 295; 524/147

[56] References Cited

U.S. PATENT DOCUMENTS

| | | |
|---|---|---|
| 2,465,319 | 3/1949 | Whinfield et al. . |
| 2,999,835 | 9/1961 | Goldberg . |
| 3,018,272 | 1/1962 | Griffing et al. . |
| 3,028,365 | 4/1962 | Schnell et al. . |
| 3,047,539 | 7/1962 | Pengilly . |
| 3,153,008 | 10/1964 | Fox . |
| 3,169,121 | 2/1965 | Goldberg . |
| 3,546,008 | 12/1970 | Shields et al. . |
| 4,001,184 | 1/1977 | Scott . |
| 4,123,436 | 10/1978 | Holub et al. . |
| 4,430,484 | 2/1984 | Quinn . |
| 4,487,896 | 12/1984 | Mark et al. . |
| 5,300,332 | 4/1994 | Kawaguchi ........................ 428/34.1 |
| 5,348,999 | 9/1994 | de Jong et al. . |
| 5,674,928 | 10/1997 | Chisholm et al. . |

FOREIGN PATENT DOCUMENTS 8803156  5/1988  WIPO .

OTHER PUBLICATIONS

Journal of Applied Polymer Science, vol. 48, 2249–2252 (1993).
Chapter 10, p 255–281 of "Engineering Thermoplastics Properties and Applications" edited by James M. Margolis, published by Marcel Dekker, Inc. 1985.
Polymer Engineering and Science vol. 19, No. 15, p1104–1109 (1979).
Journal of Polymer Science Part A–1 vol. 9 p3263–3299 (1971).

*Primary Examiner*—Patricia A. Short

[57] ABSTRACT

A thermoplastic resin composition comprising:

(a) Alkylene aryl polyester copolymers having metal sulfonate units represented by the formula IA:

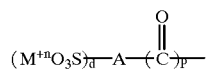

or the formula IB:

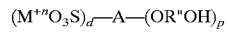

where $p=1–3$, $d=1–3$, $p+d=2–6$, $n=1–5$, and A is an aryl group containing one or more aromatic rings where the sulfonate substituent is directly attached to an aryl ring, R" is a divalent alkyl group and the metal sulfonate group is bound to the polyester through ester linkages;

(b) An essentially amorphous polycarbonate, polyester carbonate or polyarylate polymer containing recurring units of the formula II:

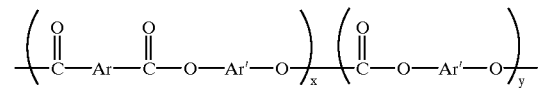

wherein Ar is divalent aromatic residue of a dicarboxylic acid or mixture of dicarboxylic acids and Ar' is the divalent aromatic residue of a dihydric phenol or mixture of dihydric phenols. The composition may further comprise acidic phosphorus based quenchers, rubbery impact modifiers, mineral fillers or reinforcements.

18 Claims, 3 Drawing Sheets

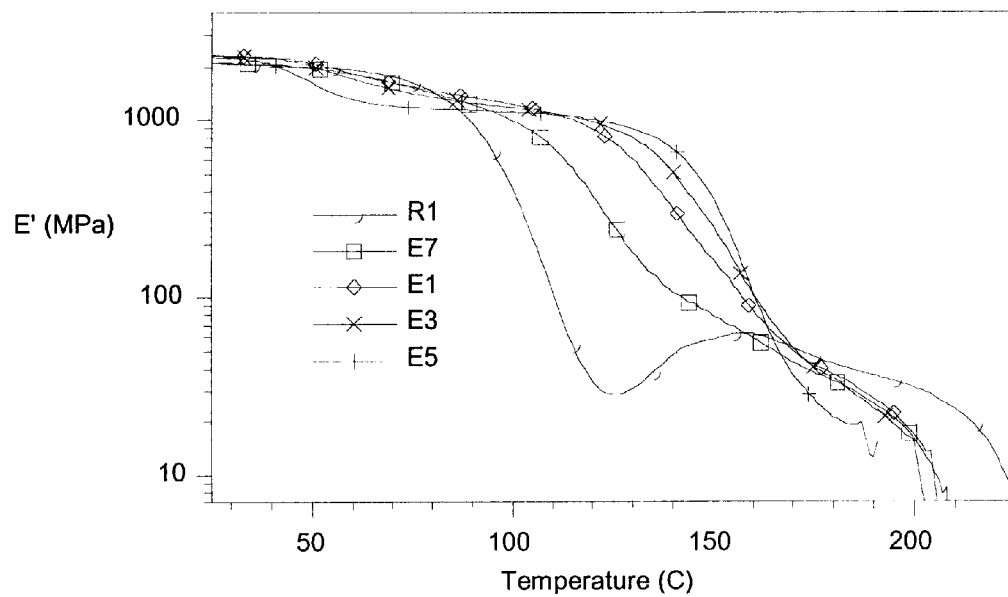
Figure 1. Storage modulus (E') as a function of temperature for PBT-ionomer/polyestercarbonate blends.
Examples; R1, E1,E3, E5 & E7.
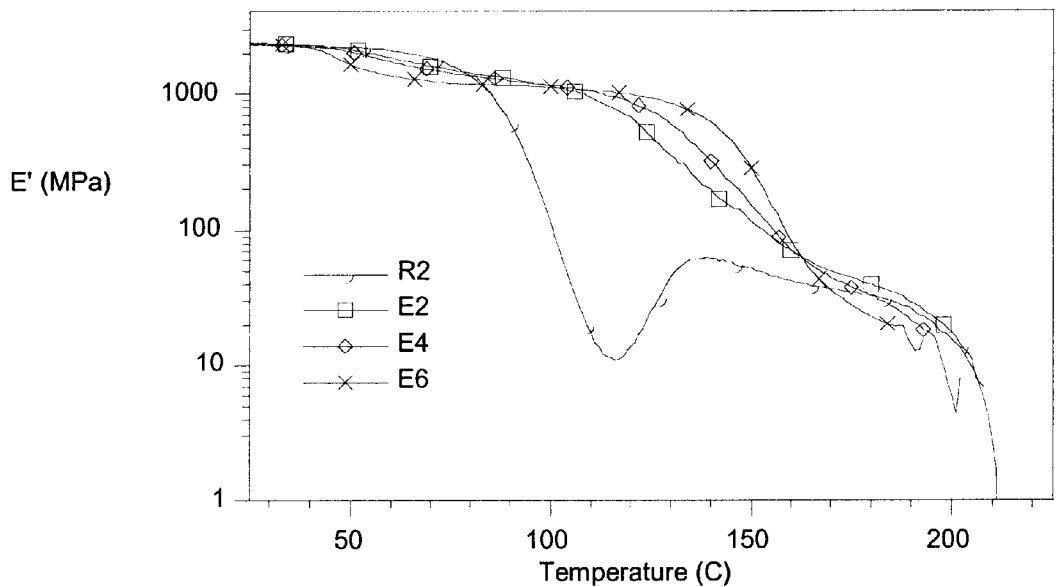
Figure 2. Storage modulus (E') as a function of temperature for PBT-ionomer/polyestercarbonate blends.

Examples; R2, E2, E4 & E6
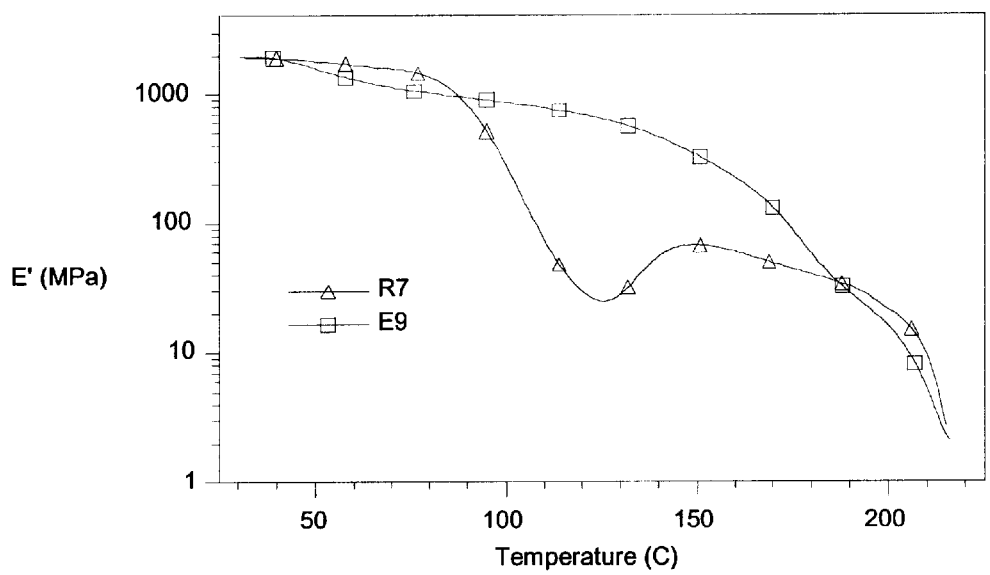
Figure 3. Storage modulus (E') as a function of temperature for a PBT-ionomer/polyarylate blend. Examples; R7 & E9

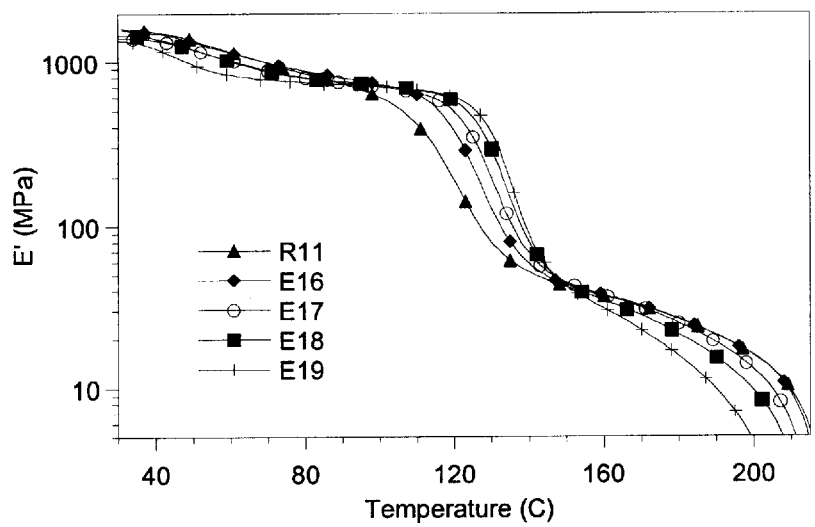
Figure 4. Storage modulus (E') as a function of temperature for PBT-ionomer/polycarbonate blends. Examples; R11, E16, E17, E18 & E19.

POLYESTER MOLDING COMPOSITION

FIELD OF THE INVENTION

The invention relates to blends of polyester resin with amorphous resins.

BACKGROUND OF THE INVENTION

Polycarbonate (PC) blends with aromatic crystalline polyesters are well known and are useful for their combination of processability, solvent resistance, appearance and impact strength. In most cases these blends also give good, uniform surface appearance. The thermal properties of these blends, especially under load, is a function of the glass transition temperature (Tg) of the polycarbonate-rich phase. To the extent that the polycarbonate is partially miscible with the polyester, the Tg of the PC rich phase of the blend will be reduced relative to pure PC Tg [ref. *J. Applied Polymer Sci.* 48, 2249 (1993)]. This will cause a drop in thermal properties like heat distortion temperature (HDT).

If one tries to address the drop in blend Tg by use of a higher Tg polycarbonate resin there may still be problems. Polyarylates and the related is polyester carbonate (PEC) resins are known to have some of the properties of polycarbonate with higher Tgs (see U.S. Pat. No. 4,430,484). However, when these polyarylates or polyester carbonates are mixed with standard alkyl terephthalate base polyesters, like PBT, there is little if any gain in HDT vs. the standard, lower Tg bisphenol A PC blends. The higher Tg polyester carbonates and polyarylates are more miscible with the alkyl terephthalate resins and the resultant Tg of the blend is about the same or lower than an analogous bis phenol-A PC-alkyl terephthalate blend.

So typically, polycarbonate/polyester blends may undergo a reduction in modulus at temperatures higher than about 50 to 180 degrees Centigrade. This is due to a reduction of the PC, polyestercarbonate or polyarylate Tg due to partial miscibility with the polyester. In bisphenol-A polycarbonate (BPA-PC) there is a significant drop in Tg on blending with polyesters, especially alkylene terephthalates. Polyester carbonates and polyarylates, with higher Tgs than the corresponding polycarbonates show an even greater drop in Tg when blended with polyesters. The drop in Tg affects properties like heat distortion temperature under load, which is dependent on high temperature modulus. Hence, it is desired to have improved blends of the polycarbonate, polyester carbonate or polyarylate/polyester type with a combination of properties including improved HDT as well as good appearance, impact and flow.

In polyester/polycarbonate blends adhesion of coatings is often a problem due to the solvent resistance of the polyesters. This has been addressed by addition of separate adhesion promoters such as polyalkylene glycols, see U.S. Pat. No. 5,348,999, and the selection of specific polyester end groups, see U.S. Pat. No. 5,674,928. However, limited adhesion of paints and coatings is still a problem in polycarbonate/polyester blends.

Thus, polycarbonate, polyester carbonate, or polyarylate/polyester blends with higher heat capability and improved coating adhesion, with retention of other desirable properties such as impact strength, dimensional stability, appearance and stiffness, are difficult to achieve. Hence, it is desired to have a polycarbonate & etc./polyester blend with a combination of properties including improved Tg, improved coating adhesion and higher HDT.

We have found that modification of a polyester resin with a small amount of a metal sulfonate salt gives blends with polycarbonate, polyester carbonates and polyarylates that have surprisingly improved Tg/HDT and better coating adhesion. These blends still have high impact strength, good stiffness and mechanical properties along with good appearance and processability.

We have also found that use of the metal sulfonate polyester copolymer modifies the rheology of the blends especially under low shear where the melt strength is enhanced. Enhanced melt strength is very beneficial in facilitating processing under low shear condition like blow molding and extrusion, it may also be useful for enhanced thermoformability.

Further many of the blends of this invention show enhanced retention of properties and appearance on weathering. Blends of metal sulfonate polyester copolymers with polyester carbonates and polyarylates show improved retention of gloss in simulated outdoor weathering vs. blends made with standard (non-aryl ester containing) polycarbonates.

SUMMARY OF THE INVENTION

Surprisingly, metal sulfonate polyesters, also referred to as ionomer polyesters, mixed with polyester carbonates, polyarylates or polycarbonates give blends that have high Tgs compared to the analogous polyesters with no sulfonate salt functionality. The higher Tgs of these compositions give higher modulus in the temperature region ranging from 50 to 180 degrees Centigrade and thus have improved dimensional stability at higher temperatures. The higher Tgs of these blends may reflect reduced miscibility of the sulfonate salt polyesters/polycarbonate, polyester carbonate or polyarylate blends compared to a standard alkyl terephthalate polyester/polycarbonate, polyester carbonate and polyarylate blends.

This specific combination of a sulfonate salt polyester, also referred to as ionomer polyester, and polycarbonate, polyester carbonate or polyarylate solves problems of coating adhesion and thermal properties while still maintaining the benefits of solvent resistance, processability, appearance, stiffness and impact strength. The present invention provides thermoplastic polyester molding compositions having enhanced heat distortion temperature or heat sag, increased low shear rheological properties, as well as improved coating adhesion, comprising a blend of polycarbonate, polyarylate or polyester carbonate resin and a polyester sulfonate salt copolymer resin.

In accordance with the present invention, there is provided a thermoplastic resin composition comprising:

(a) Alkylene aryl polyester copolymers having metal sulfonate units represented by the formula IA:

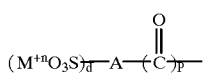

or the formula IB:

where p=1–3, d=1–3, p+d=2–6, n=1–5, and A is an aryl group containing one or more aromatic rings where the sulfonate substituent is directly attached to an aryl ring, R" is a divalent alkyl group and the metal sulfonate group is bound to the polyester through ester linkages;

(b) an essentially amorphous polycarbonate, polyester carbonate or polyarylate polymer containing recurring units of the formula II:

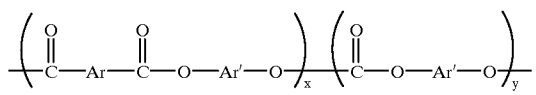

wherein Ar is divalent aromatic residue of a dicarboxylic acid or mixture of dicarboxylic acids and Ar' is the divalent aromatic residue of a dihydric phenol or mixture of dihydric phenols and where, based on mole percent, x and y may each be from 0 to 100 percent.

According to the preferred embodiments, a functional sulfonate salt "ionomer" group is incorporated into the polyester so that a blend of polyester ionomer and polycarbonate, polyarylate or polyester carbonate has improved properties as compared to blends not utilizing the polyester ionomer.

According to another embodiment, the above blends of polycarbonate, polyarylate or polyester carbonates with metal sulfonate polyester copolymers may have addition ingredients such as: other resins, fillers, reinforcements, stabilizers, flame retardants and rubbery impact modifiers.

BRIEF DESCRIPTION OF THE DRAWINGS

FIG. 1 is a graph of storage modulus (E') as a function of temperature for PBT-ionomer/polyestercarbonate blends and relates to Examples R1, E1, E3, E5 and E7.

FIG. 2 is a graph of storage modulus (E') as a function of temperature for PBT-ionomer/polyestercarbonate blends and relates to Examples R2, E2, E4 and E6.

FIG. 3 is a graph of storage modulus (E') as a function of temperature for a PBT-ionomer/polyarylate blend and relates to Examples R7 and E9.

FIG. 4 is a graph of storage modulus (E') as a function of temperature for PBT-ionomer/polycarbonate blends and relates to Examples R11, E16, E17, E18 and E19.

DETAILED DESCRIPTION OF PREFERRED EMBODIMENTS

The term polyester ionomer, or sulfonate polyester or metal sulfonate polyester, refers to polyester polymers derived from the reaction residue of an aryl carboxylic sulfonate salt, an aromatic dicarboxylic acid, an aliphatic diol or any of their ester forming derivatives. The ionomer polyester polymers comprise some monovalent and/or divalent sulfonate salt units represented by the formula IA:

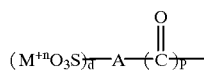

or formula IB:

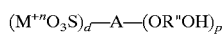

wherein p=1–3; d=1–3, and p+d=2–6, and A is an aryl group containing one or more aromatic rings: for example, benzene, naphthalene, anthracene, biphenyl, terphenyl, oxy diphenyl, sulfonyl diphenyl or alkyl diphenyl, where the sulfonate substituent is directly attached to an aryl ring. These groups are incorporated into the polyester through carboxylic ester linkages. The aryl groups may contain one or more sulfonate substituents; d=1–3 and may have one or more carboxylic acid linkages; p=1–3. Groups with one sulfonate substituent (d=1) and two carboxylic linkages (p=2) are preferred. M is a metal, n=1–5. Preferred metals are alkaline or alkaline earth metals where n=1–2. Zinc and tin are also preferred metals. R" is a alkyl group: for example, —$CH_2CH_2$—, —$CH_2CH_2OCH_2CH_2$—, —$CH(CH_3)CH_2$—, $CH_2CH_2CH_2$—, —$CH_2CH_2CH_2CH_2$—

Typical sulfonate substituents that can be incorporated into the metal sulfonate polyester copolymer may be derived from the following carboxylic acids or their ester forming derivatives; sodium sulfo isophthalic acid, potassium sulfo terephthalic acid, sodium sulfo naphthalene dicarboxylic acid, calcium sulfo isophthalate, potassium 4,4'-di (carbomethoxy)biphenyl sulfonate, lithium 3,5-di (carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate and dimethyl 5-[4-(sodiosulfo)phenoxy]isophthalate. Other suitable sulfonate carboxylic acids and their ester forming derivatives are described in U.S. Pat. Nos. 3,018,272 and 3,546,008. The most preferred sulfonate polyesters are derived from sodium 3,5-dicarbomethoxy benzene sulfonate.

Preferred ionomer polyester polymer comprises divalent ionomer units represented by the formula III:

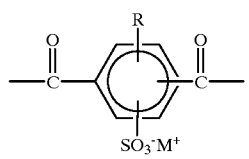

wherein R is hydrogen, halogen, alkyl or aryl, and M is a metal.

The most preferred polyester ionomer has the formula IV:

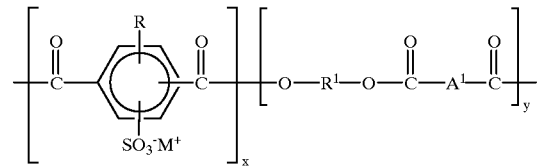

where the ionomer units, x, are from 0.1–50 mole percent of the polymer with 0.5 to 10 mole percent being preferred. Most preferably R is hydrogen.

Typical glycol or diol reactants, $R^1$, include straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters and the like.

Examples of aromatic dicarboxylic acid reactants, as represented by the decarboxylated residue $A^1$, are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid or mixtures thereof.

The most preferred ionomer polyesters are poly(ethylene terephthalate) (PET) ionomers, and poly(1,4-butylene terephthalate) ionomers, (PBT), and (polypropylene terephthalate) (PPT) ionomers.

Also contemplated herein are the above polyester ionomers with minor amounts, e.g., from about 0.5 to about 15 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin used in this invention is one obtained by polymerizing an ionomer component comprising a dimethyl 5-sodium sulfo-1,3-phenylenedicarboxylate, from 1 to 10 mole %, a glycol component of at least 70 mole %, preferably at least 90 mole %, of tetramethylene glycol and an acid component of at least 70 mole %, preferably at least 90 mole %, of terephthalic acid, and polyester-forming derivatives therefore.

The glycol component should contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component should contain not more than 30 mole %, preferably not more than 20 mole %, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester-forming derivatives thereof.

It is also possible to use a branched polyester ionomers in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl end groups on the polyester, depending on the ultimate end-use of the composition.

In some instances, it is desirable to reduce the number of acid end groups, typically to less than about 30 micro equivalents per gram, with the use of acid reactive species. In other instances, it is desirable that the polyester has a relatively high carboxylic end group concentration.

Blends of polyesters ionomers with non sulfonate salt polyesters may also be employed as the polyester ionomer composition. For example the invention may consist of a blend of polycarbonate, with conventional, non sulfonate salt PBT and the PBT ionomer resin. Preferred non sulfonate salt polyesters are the alkylene phthalate polyesters.

The polycarbonate, polyarylate or polyester carbonate used in combination with the sulfonate salt polyester copolymers can be described by the following formula II:

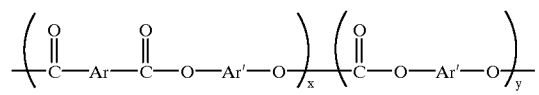

wherein Ar is divalent aromatic residue of the dicarboxylic acid or mixture of dicarboxylic acids and Ar' is the divalent aromatic residue of the dihydric phenol or mixture of dihydric phenols employed.

For the polycarbonate resins x=0, for the polyester carbonate resins x=1–99 and y=99–1 weight percent. When y=0, where the carbonate linkages are absent, the aromatic polyester resin is known as a polyarylate resin. The polycarbonate, polyester carbonate and polyarylate resins represent a continuum of structures that are all included in the scope of this invention and give enhanced properties when blended with the sulfonate salt containing polyesters of this invention.

In the preferred polyester carbonate (PEC)/polyarylate (PAr) resin of formula II, y, the carbonate content, is from 0 to about 80 and preferably from 5 to about 70 and x, the aromatic esters content, is about 20 to about 100 and preferably from about 30 to about 95%. More preferably x is from 50 to about 95, most preferably from 60 to 80%. In formula II x and y represent the respective moles of carbonate units and aromatic ester units.

Ar is an aryl group and most preferably the residue from iso- and terephthalate or mixtures thereof and has the formula V:

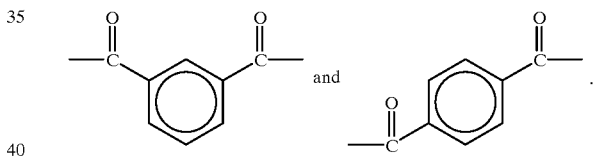

The dihydric phenols employed are known, and give rise to the Ar' groups. Typical of some of the dihydric phenols employed are bis-phenols such as bis-(4-hydroxy-phenyl) methane, 2,2-bis(4-hydroxyphenyl)propane (also known as bisphenol-A), 2,2-bis(4-hydroxy-3,5-dibromo-phenyl) propane; dihydric phenol ethers such as bis(4-hydroxyphenyl) ether, bis(3,5-dichloro-4-hydroxyphenyl) ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl) sulfone, dihydroxy benzenes such as resorcinol, hydroquinone; halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)sulfide, bis(4-hydroxy-phenyl)sulfoxide and bis (3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The divalent residue of dihydric phenols, Ar' may be represented by the general formula VI:

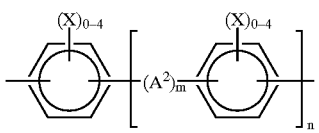

wherein $A^2$ is a divalent hydrocarbon radical containing from 1 to about 15 carbon atoms or a substituted divalent hydrocarbon radical containing from 1 to about 15 carbon atoms and substituent groups such as halogen; —S—; —S(O)$_2$— or —O—; each X is independently selected from the group consisting of hydrogen, halogen, and a monovalent hydrocarbon radical such as an alkyl group of from 1 to about 8 carbon atoms, an aryl group of from 6 to about 18 carbon atoms, an aralkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

These polymers may be prepared by a variety of methods, for example by either melt polymerization or by interfacial polymerization. A discussion of Polyarylate resins and their synthesis is contained in chapter 10 p255–281 of *"Engineering Thermoplastics Properties and Applications"* edited by James M. Margolis, published by Marcel Dekker Inc. 1985

Melt polymerization methods to make PC, PEC and polarylate resins may involve co-reacting, for example, various mixtures of dihydric phenols and ester precursors such as, for example, diphenyl derivatives of iso- and terephthalates, and their mixtures. Diphenyl carbonate may be introduced to prepare polyester carbonate copolymers or used alone to make the polycarbonate resins. Various catalysts or mixtures of catalysts such as, for example, lithium hydroxide and lithium stearate can also be used to accelerate the polymerization reactions.

In general, the method of interfacial polymerization comprises the reaction of a dihydric phenol with diacid or derivative ester precursor and/or a carbonate precursor, in a two phase system with catalyst and often an acid acceptor when the dicarboxylic acid and carbonate precursors are diacid halides. Examples of interfacial polymerization techniques can be found in U.S. Pat. Nos. 3,169,121 and 4,487,896 which are incorporated herein by reference.

Although the reaction conditions of the preparative processes may vary, several of the preferred processes typically involve dissolving or dispersing dihydric phenol reactants in aqueous caustic, combining the resulting mixture with a suitable water immiscible solvent medium and contacting the reactants with the carbonate precursor, such as, for example, phosgene, and diacids or derivatives, such as diacid chlorides, in the presence of a suitable catalyst and under controlled pH conditions. The most commonly used water immiscible solvents include methylene chloride, 1,2-dichloroethane, chlorobenzene, toluene, and the like. Advantageously a catalyst may be added to the reaction mixture to promote the reaction. The catalyst typically accelerates the rate of polymerization of the dihydric phenol reactants with the carbonate/ester precursors. Representative catalysts include but are not limited to, for example, tertiary amines such as triethylamine, quaternary phosphonium compounds, quaternary ammonium compounds, and the like.

The preferred process for preparing polycarbonate and polyester carbonate copolymers comprises a phosgenation reaction. The temperature at which the phosgenation reaction proceeds may vary from below about 0° C. to about 100° C. The phosgenation reaction preferably proceeds at temperatures of from about room temperatures (about 23° C.) to about 50° C. Since the reaction is exothermic, the rate of phosgene addition may be used to control the reaction temperature.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxy-3,5-dichlorophenyl)-propane, hydroquinone, and the like, or bishaloformates of glycol, and the like. While all of the above carbonate precursors are useful, carbonyl chloride, also known as phosgene, is preferred.

In general, any dicarboxylic acid conventionally used in the preparation of polyesters may be utilized in the preparation of polyester carbonate resins. However, the PEC used in the present invention are prepared with aromatic dicarboxylic acids, and in particular terephthalic acid, and mixtures thereof with isophthalic acid wherein the weight ratio of terephthalic acid to isophthalic acid is in the range of from about 5:95 to about 95:5.

Rather than utilizing the dicarboxylic acid per se, it is possible, and sometimes even preferred, to employ various derivatives of the acid moiety. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride.

In the conventional interfacial polymerization methods of preparing PEC, polycarbonates and polyarylates, a molecular weight regulator (a chain stopper) is generally added to the reaction mixture prior to or during the polymerization reactions with carbonate and/or ester precursors. Useful molecular weight regulators include, for example, monohydric phenols such as phenol, chroman-I, para-t-butylphenol, p-cumylphenol and the like. All types of polycarbonate, polyester carbonate and polyarylate end groups are contemplated as being within the scope of the present invention.

The proportions of reactants employed to prepare the PEC will vary in accordance with the proposed use of the blends of the invention containing this product resin. In general, the amount of the combined ester units may be from about 20% by weight to about 100% by weight, relative to the carbonate units.

The preferred PEC for use in the blends of the present invention are those derived from reaction of bisphenol-A and phosgene with iso- and terephthaloyl chloride and having an intrinsic viscosity of about 0.5 to about 0.65 deciliters per gram (measured in methylene chloride at a temperature of 25° C.).

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and branched polycarbonate. Moreover, blends of any of the above materials may be employed in the practice of this invention to provide the aromatic polycarbonate.

In any event, the preferred aromatic polycarbonate for use in the practice in the present invention is derived from 2,2-bis(4-hydroxyphenyl)propane (bisphenol-A) and phosgene, commercially available under the trade designation LEXAN Registered TM from General Electric Company.

The instant polycarbonates are preferably high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The preferred polyarylates are derived from bis phenol A with mixture of isophthalic and terephthalic acid.

Blends of different polycarbonates, polyarylates and polyester carbonates may also be used in these compositions.

Resins containing aromatic carboxylate-aryl esters linkages, like polyester carbonates and polyarylates are known to have good weathering characteristics. (refs. *J. Polymer Sci. Part A-1*, 9, 3263, 1971 and chapter 10, p265–268 of "Engineering Thermoplastics Properties and Applications" edited by James M. Margolis, published by Marcel Dekker, Inc.). Although these resins change color on exposure to light they have other desirable attributes such as retention of gloss and or mechanical properties. We have found that the polyester carbonate and polyarylate blends of this invention, with polyester ionomers, also have enhanced weathering capability vs. an aromatic polycarbonate/polyester ionomer blend with no aryl ester linkages.

The composition of the present invention may include additional components which do not interfere with the previously mentioned desirable properties. The composition may optionally contain impact modifiers such as a rubbery impact modifier. Preferably such impact modifiers are utilized in an amount less than about 30%, and preferably less than about 20 percent, more preferably less than about 15 percent by weight based on the total weight of the composition. Typical impact modifiers are derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials showing elasticity at room temperature. They include both homopolymers and copolymers, including random, block, radial block, graft and core-shell copolymers as well as combinations thereof. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth) acrylate. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate. Other higher olefin monomers can be employed in copolymers with alkyl acrylates, for example, propylene and n-butyl acrylate. The olefin diene terpolymers are well known in the art and generally fall into the EPDM (ethylene propylene diene) family of terpolymers. Polyolefins such as polyethylene and polyethylene copolymers with alpha olefins are also of use in these compositions. Polyolefin copolymers with gylcidyl acrylates or methacrylates may be especially effective in the impact modification of polyester containing blends. Terpolymers of ethylene with alkyl acrylates or methacrylates and glycidyl methacrylates may be especially preferred.

Styrene-containing polymers can also be used as impact modifiers. Examples of such polymers are acrylonitrile-butadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), and other high impact styrene-containing polymers.

Additionally, it may be desired to employ an inorganic filler to the thermoplastic resin to impart additional beneficial properties such as thermal stability, increased density, stiffness and texture. Typical inorganic fillers include: alumina, amorphous silica, anhydrous alumino silicates, mica, feldspar, clays, talc, glass flake, glass fibers, glass microspheres, metal oxides such as titanium dioxide, zinc sulfide, ground quartz, and the like. Some inorganic fillers may provide a ceramic-like feel to articles formed from the resin composition. Preferred inorganic fillers which are employed in the present thermoplastic compositions include barium sulfate and fiberglass.

The molding compositions may include from 0 to about 65% by weight, preferably from about 10 to about 50% by weight or most preferably from about 10 to about 40% by weight of total composition of an inorganic filler component. Fiber glass is the most preferred filler.

In the thermoplastic compositions which contain a polyester resin and a polycarbonate, polyester carbonate or polyarylate resin, it is preferable to use a stabilizer or quencher material. Typically, such stabilizers are used at a level of 0.001–10 weight percent and preferably at a level of from 0.005–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester, polyester carbonate or polyarylate resin component, the polycarbonate with and without the particular compound and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like.

The phosphites may be of the formula:

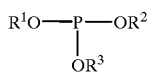

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate, copper phosphate and the like. The phosphorus oxo acids include phosphorous acid, phosphoric acid, polyphosphoric acid or hypophosphorous acid.

The polyacid pyrophosphates may be of the formula:

$$M^z_x H_y P_n O_{3n+1}$$

wherein M is a metal, x is a number ranging from 1 to 12 and y is a number ranging 1 to 12, n is a number from 2 to 10, z is a number from 1 to 5 and the sum of (xz)+y is equal to n+2. M is preferred to be an alkaline or alkaline earth metal.

The blends of this invention can be processed by various techniques including injection molding, blow molding, extrusion into sheet, film or profiles, compression molding and etc. They can also be formed into a variety of articles for use in, for example; electrical devices, computers, building and construction, outdoor equipment, trucks and automobiles.

EXAMPLES

The following examples illustrate the present invention, but are not meant to be limitations to the scope thereof.

The ingredients of the examples shown in the tables below were tumble blended and then extruded on a 30 mm, vacuum vented, twin screw extruder at a barrel and die head temperature between 490 and 510 degrees F. and 250 rpm screw speed. The extrudate was cooled through a water bath prior to pelletizing. Glass filled blends were extruded on a 2.5 inch HPM single screw extruder with a vacuum vented, double-wave screw, 30:1 L/D, at a barrel and die head temperature between 490 and 510 degrees F. and 100 rpm screw speed Test parts were injection molded on a van Dorn molding machine with a set temperature of approximately 500 to 510° F. The pellets were dried for 3–4 hours at 250° F. in a forced air circulating oven prior to injection molding.

Gloss and color retention after accelerated weathering was measured on injection molded specimens that were weathered according to ASTM G26 weathering method using an Atlas Ci65/DMC weatherometer. Gloss at 60° was measured using ASTM D523. Chip color was measured on a ACS CS-5 ChromoSensor in reflectance mode with a D65 illuminant source, a 10 degree observer, specular component included. CIE color scale is described in "Principles of Color Technology" F. W. Billmeyer and M. Saltzman/John Wiley & Sons, 1966. The color change is expressed as ΔE (delta E). Exposure time is measured as Kilojoules/m².

Mechanical properties were tested as follows; Notched Izod ASTM D256, HDT at 66 & 264 psi ASTM D648, biaxial impact was measured on a Dynatup brand instrument using ASTM D3763, tensile properties were measured as per ASTM D638, flexural properties were measured as per ASTM D790. Dynamic mechanical analysis (DMA) was used to measure the storage modulus (E') of materials as a function of temperature. The analyser used was a TA Instruments model 2980 Dynamic Mechanical Analyzer equipped a dual cantilever fixture and operating at a heating rate of 3° C./min., frequency of 1.0 Hz, and vibration amplitude of 20 micrometers. All specimens were injection molded and were approximately 2.5 inches long, 0.5 inches wide, and 0.125 inches thick. E' is measured as Mpa.

DMA traces if several examples, shown in FIGS. 1–4, further illustrate the improved modulus vs. temperature capabilities of the blends of the invention compared to the reference materials. HDT may be measured from DMA values using the method of Takemori as described in *Polymer Engr. & Sci.* 19(15), 1104 (1979).

TABLE I

| Description of Raw Materials | |
|---|---|
| PBT | Polybutylene terephthalate, VALOX ® 315 from GE Plastics |
| PBT-1%SO3Na | Shown in Formula VII with x = 0.01 |
| PBT-3%SO3Na | Shown in Formula VII with x = 0.03 |
| PBT-5%SO3Na | Shown in Formula VII with x = 0.05 |
| PBT-10%SO3Na | Shown in Formula VII with x = 0.10 |
| PET | Polyethylene terephthalate, CRYSTAR ® 3948 from DuPont |
| PET-2.2%SO3Na | Sulfonated PET |
| PC | Polycarbonate, Mw = 24,000, LEXAN ® resin from GE Plastics |
| Branched PC | Polycarbonate branched with trifunctional branching agent, Mw = 37,700, LEXAN ® resin from GE Plastics |
| PEC-A | Polyestercarbonate containing 6 wt. % terephthalate ester, 74 wt. % isophthalate ester, 20 wt. % carbonate, Mw = 28,500 |
| PEC-B | Polyestercarbonate containing 30 wt. % terephthalate ester, 30 wt. % isophthalate ester, 40 wt. % carbonate, Mw = 28,350 |
| Par | Polyarylate, U-100 from Unitika |
| MBS | Butadiene-based core-shell impact modifier, Paraloid EXL3691 from Rohm and Haas Co. |
| Acrylic | Acrylic-based core-shell impact modifier, Paraloid EXL3330 from Rohm and Haas Co. |
| Glass Fiber | OC 183F from Owens Corning |
| Carbon Black-A | Black Pearls 800 from Cabot Corp. |
| Carbon Black-B | Channel Black FW200 from Degussa Corp. |
| Carbon Black-C | Vulcan 9A32 from Cabot Corp. |
| Irgaphos 168 | Triaryl phosphite stabilizer from Ciba-Geigy Co. |
| Seenox 412S | Thioester stabilizer from Witco Chemical Corp. |
| PEPQ | Phosphonite stabilizer from Sandoz Chemical Corp. |
| Irganox 1010 | Hindered phenol stabilizer from Ciba-Geigy Co. |
| Irganox 1076 | Hindered phenol stabilizer from Ciba-Geigy Co. |
| H3PO3 | 45% aqueous phosphorous acid |

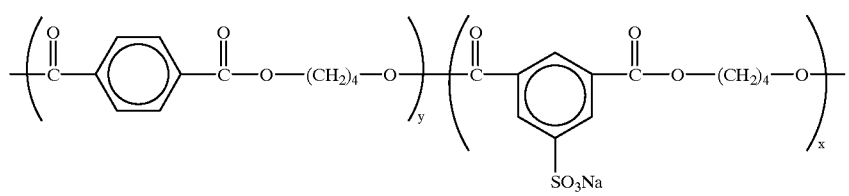

Formula VII. Composition of PBT-ionomers.

The PBT-ionomers used in some of the examples to follow were produced by the melt polymerization of dimethylterephthalate (DMT), dimethyl-5-sodiosulfo-1,3-phenylene dicarboxylate (DMSIP), and 1,4-butanediol (BD) using tetraisopropyl titanate (TPT) as a catalyst. For example, a PBT-ionomer containing 5.0 mole percent sulfonate (PBT-5% SO3Na) was produced by adding 123.3 lbs of DMT, 9.90 lbs. of DMSIP, 100.1 lbs. of BD, and 43 mls. of TPT to a 40CV Helicone reactor which was preheated to 130° C. The monomer mixture was then heated to 225° C. at a rate of 1.5° C./minute under atmospheric pressure and most of the methanol by-product removed by distillation. The mixture was then subjected to a gradual reduction in pressure at a rate of 20 mm Hg/minute while the temperature was simultaneously increased to 250° C. at a rate of 1.5° C./minute. The total time under vacuum was 68 minutes. This polymerization produced a PBT-ionomer with a melt viscosity at 250° C. and shear rate of about 100 s$^{-1}$ of about 9,000 poise.

Examples E1–E7, R1–R3

Entries in each of the tables to follow represents a single experiment. Thus, for each example in a given table, the extrusion conditions, molding conditions, testing conditions, etc. were identical. The materials designated "R1", "R2", etc. are reference materials while materials designated "E1", "E2", etc. are examples of the invention.

TABLE II

Examples of PBT-ionomer/polyester carbonate blends

| Example no. | R1 | R2 | R3 | E1 | E2 |
|---|---|---|---|---|---|
| Wt. % PBT | 40.00 | 40.00 | 40.00 | — | — |
| Wt. % PBT-3%SO3Na | — | — | — | 40.00 | 40.00 |
| Wt. % PC | — | — | 59.32 | — | — |
| Wt. % PEC-A | 59.32 | — | — | 59.32 | — |
| Wt. % PEC-B | — | 59.32 | — | — | 59.32 |
| Wt. % Carbon Black-A | 0.60 | 0.60 | 0.60 | 0.60 | 0.60 |
| Wt. % H3PO3 | 0.08 | 0.08 | 0.08 | 0.08 | 0.08 |
| E' at 100° C. (MPa) | 406 | 111.7 | 1159 | 1222 | 1136 |
| E' at 125° C. (MPa) | 28.41 | 25.08 | 679.7 | 753.7 | 488.5 |
| E' at 150° C. (MPa) | 57.81 | 51.74 | 96.17 | 159.3 | 114.80 |
| Weathering Exposure | Gloss/ΔE | Gloss/ΔE | Gloss/ΔE | Gloss/ΔE | Gloss/ΔE |
| 0 kJ/m² | 100/0 | 100/0 | 100/0 | 100/0 | 100/0 |
| 900 kJ/m² | 100/0.56 | 99/0.64 | 78/0.75 | 100/1.00 | 100/0.93 |
| 1471 kJ/m² | 100/1.00 | 93/1.41 | 61/1.30 | 100/1.62 | 100/1.38 |
| 1853 kJ/m² | 100/1.00 | 100/1.24 | 23/2.49 | 99/1.85 | 100/2.53 |
| 2313 kJ/m² | 97/0.37 | 88/1.42 | 3/6.97 | 96/1.64 | 92/1.69 |
| 2563 kJ/m² | 97/0.70 | 84/1.08 | — | 87/1.77 | 85/1.38 |

TABLE III

Examples of PBT-ionomer/polyester carbonate blends

| Example no. | E3 | E4 | E5 | E6 | E7 |
|---|---|---|---|---|---|
| Wt. % PBT-5%SO3Na | 40 | 40 | — | — | — |
| Wt. % PBT-10%SO3Na | — | — | 40 | 40 | — |
| Wt. % PBT-1%SO3Na | — | — | — | — | 40 |
| Wt. % PEC-A | 59.32 | — | 59.32 | — | 59.32 |
| Wt. % PEC-B | — | 59.32 | — | 59.32 | — |
| Wt. % Carbon Black-A | 0.60 | 0.60 | 0.60 | 0.60 | 0.60 |
| Wt. % H3PO3 | 0.08 | 0.08 | 0.08 | 0.08 | 0.08 |
| E' at 100° C. (MPa) | 1169 | 1156 | 1109 | 1114 | 989.20 |
| E' at 125° C. (MPa) | 887.9 | 742 | 953.6 | 926.1 | 259.00 |
| E' at 150° C. (MPa) | 248.1 | 151.8 | 356.7 | 282.1 | 77.56 |
| Weathering Exposure | Gloss/ΔE | Gloss/ΔE | Gloss/ΔE | Gloss/ΔE | Gloss/ΔE |
| 0 kJ/m² | 100/0 | 100/0 | 100/0 | 100/0 | 100/0 |
| 900 kJ/m² | 100/0.40 | 100/1.16 | 98/0.53 | 90/0.77 | 100/0.31 |
| 1471 kJ/m² | 100/1.19 | 91/1.30 | 86/0.63 | 76/0.79 | 100/1.00 |
| 1853 kJ/m² | 95/1.39 | 100/2.60 | 78/0.63 | 81/2.08 | 100/1.50 |
| 1995 kJ/m² | 100/1.47 | 100/0.36 | 71/1.88 | 53/1.07 | 98/1.32 |
| 2313 kJ/m² | 93/1.58 | 74/1.55 | 46/2.68 | 29/3.29 | — |
| 2563 kJ/m² | 85/1.86 | 63/0.76 | — | — | — |

Examples E1–E7 show the effect sulfonate group concentration has on storage modulus (E') of blends containing PECs. A comparison of storage modulus (E') as a function of temperature for the blends described in Tables II and III (see FIGS. 1 and 2), shows that the incorporation of sulfonate groups into PBT results in a dramatic increase in E' between about 80° C. and 160° C. for blends containing PECs. This increase in E' demonstrates that PBT-ionomer/PEC blends are dramatically stiffer, and therefore more resistant to creep, over this temperature range than analogous PBT/PEC blends (R1, R2) which is necessary for dimensional stability.

In addition, the increase in E' occurring between about 120° C. to 150° C. for R1 and R2 (FIGS. 1 & 2), due to crystallization of PBT during the DMA test, was not observed for E1–E7. This result indicates that the examples of the invention possess better dimensional stability over this temperature range than the reference blends with no metal sulfonate ionomer.

Note also the superior retention of gloss and delta E on weathering achieved by all the PEC containing blends compared to the BPA-PC blend; R3.

Examples R4, E8

Blends of PBT metal sulfonate resin with BPA polyarylate, E8, also show improved stiffness over the standard PBT blends with the same polyarylate; R4 (see FIG. 3).

TABLE IV

Examples of PBT-Ionomer/Polyarylate Blends

| Example no. | R4 | E8 |
|---|---|---|
| Wt. % PBT | 40 | — |
| Wt. % PBT-5%SO3Na | — | 40 |

TABLE IV-continued

Examples of PBT-Ionomer/Polyarylate Blends

| Example no. | R4 | E8 |
|---|---|---|
| Wt. % PAr | 59.32 | 59.32 |
| Wt. % Carbon Black-B | 0.60 | 0.60 |
| Wt. % H3PO3 | 0.08 | 0.08 |
| E' at 100° C. (MPa) | 280.90 | 859.10 |
| E' at 125° C. (MPa) | 24.67 | 638.60 |
| E' at 150° C. (MPa) | 67.40 | 332.10 |

Examples R5, E9–E10

The improvement in thermomechanical properties obtained by replacing PBT in a blend with PEC by PBT-ionomer can also be applied to glass-filled material as shown by the increase in HDT of E9 over R5 described in Table V. In addition to improving HDT, the presence of the PBT-ionomer was also found to improve paint adhesion as shown in Table V. Paint adhesion was tested using a cross hatch tape pull test. Paints were Red Spot 206LE/317 urethane or PPG BWB9753 base coat with primers. Example E10 shows the used of a PET sodium sulfonate copolymer in the invention.

TABLE V

Example of a glass-filled PBT-ionomer/polyester carbonate blend

| Example no. | R5 | E9 | E10 |
|---|---|---|---|
| Wt. % PBT | 46.45 | — | — |
| Wt. % PBT-5%SO3Na | — | 46.45 | — |
| Wt. % PET-2.2%SO3Na | — | — | 46.45 |
| Wt. % PEC-A | 22 | 22 | 22 |
| Wt. % glass fiber | 30 | 30 | 30 |
| Wt. % PC | 1 | 1 | 1 |
| Wt. % carbon black-B | 0.50 | 0.50 | 0.50 |
| Wt. % H3PO3 | 0.05 | 0.05 | 0.05 |
| HDT at 264 psi (° C.) | 66 | 102 | 80 |
| HDT at 66 psi (° C.) | 80 | 144 | — |
| Paint adhesion PPG + primer | Fail/Fail | Pass/Pass | Pass/Pass |
| Paint adhesion PPG no primer | Fail/Fail | Pass/Pass | Pass/Pass |
| Paint adhesion Redspot | Fail/Fail | Pass/Pass | Pass/Pass |

Examples R6–R8, E11–E13

Blends of metal sulfonate resins were made with BPA polycarbonate resin (Table VI). An MBS core shell rubber was also added to the blend. Note that as in earlier examples, all blends contain an acidic quencher (H3PO3).

Similar to PBT/PEC and PBT/PAr blends albeit to a lower degree, the incorporation of sulfonate groups into PBT resulted in an increase in E' for blends with PC (E11,E12, E13 vs. R6,R7,R8). This result shows that PBT-ionomer/PC blends possess greater stiffness and resistance to creep over this temperature range than analogous PBT/PC blends.

TABLE VI

Examples of PBT-ionomer/polycarbonate blends

| | R6 | R7 | R8 | E11 | E12 | E13 |
|---|---|---|---|---|---|---|
| Wt. % PBT | 40.00 | 50.00 | 60.00 | — | — | — |
| Wt. % PBT-5%SO3Na | — | — | — | 40.00 | 50.00 | 60.00 |
| Wt. % PC 120 | 47.57 | 37.57 | 27.57 | 47.57 | 37.57 | 27.57 |
| Wt. % MBS | 12 | 12 | 12 | 12 | 12 | 12 |
| Wt. % Irgaphos 168 | 0.15 | 0.15 | 0.15 | 0.15 | 0.15 | 0.15 |
| Wt. % Irganox 1010 | 0.20 | 0.20 | 0.20 | 0.20 | 0.20 | 0.20 |
| Wt. % H3PO3 | 0.08 | 0.08 | 0.08 | 0.08 | 0.08 | 0.08 |
| E' at 100° C. (MPa) | 612.30 | 471.90 | 348.10 | 688.90 | 572.50 | 456.10 |
| E' at 125° C. (MPa) | 149.90 | 173.40 | 167.90 | 399.90 | 287.90 | 207.50 |
| E' at 150° C. (MPa) | 39.46 | 50.52 | 61.66 | 44.62 | 60.62 | 74.46 |
| Notched Izod (ft.lb./in.) | 13.4 | 14.6 | 16.5 | 12.1 | 13.4 | 14.3 |

Examples R9–10, E14–15

Further examples of PBT-ionomer/polycarbonate blends are shown in Table VII which shows that impact modified PBT-ionomer/PC blends containing high PC contents (E14 and E15) possess significantly higher HDT than similar PBT/PC blends (R9 and R10).

TABLE VII

Examples of PBT-ionomer/polycarbonate blends

| | R9 | R10 | E14 | E15 |
|---|---|---|---|---|
| Wt. % PBT | 15.24 | 15.24 | — | — |
| Wt. % PBT-10%SO3Na | — | — | 15.24 | 15.24 |
| Wt. % PC | 74.41 | 74.41 | 74.41 | 74.41 |
| Wt. % Acrylic | — | 5 | — | 5 |
| Wt. % MBS | 10 | 5 | 10 | 5 |
| Wt. % Additives* | 0.35 | 0.35 | 0.35 | 0.35 |
| HDT, 264 psi (° C.) | 97 | 99 | 109 | 109 |
| HDT, 66 psi (° C.) | 112 | 113 | 128 | 129 |
| NI −30° C. (ft-lbs/in) | 10.8 | — | 10.0 | 11.8 |
| NI −40° C. (ft-lbs/in) | 9.6 | 10.9 | 8.8 | 9.8 |
| Biaxial Impact, −30° C. (ft-lbs) | — | 46.6 | 44.9 | 42.5 |
| Biaxial Impact, −40° C. (ft-lbs) | 49.7 | 55.8 | 46.9 | 44.1 |

*Additives — 0.2, 0.1, and 0.05 pph of Irgaphos 168, mono zinc phosphate, and talc, respectively.

Examples R11, E16–E19

Table VIII shows that increasing metal sulfonate content of the PBT-ionomer increases HDT and storage modulus while maintaining good ductility as measured by notched Izod impact. FIG. 4 shows storage modulus as a function of temperature for the examples described in Table VIII.

TABLE VIII

Examples of PBT-ionomer/polycarbonate blends

| | R11 | E16 | E17 | E18 | E19 |
|---|---|---|---|---|---|
| Wt. % PBT | 40.00 | — | — | — | — |
| Wt. % PBT-1%SO3Na | — | 40.00 | — | — | — |
| Wt. % PBT-3%SO3Na | — | — | 40.00 | — | — |
| Wt. % PBT-5%SO3Na | — | — | — | 40.00 | — |
| Wt. % PBT-10%SO3Na | — | — | — | — | 40.00 |
| Wt. % PC | 47.57 | 47.57 | 47.57 | 47.57 | 47.57 |
| Wt. % MBS | 12.00 | 12.00 | 12.00 | 12.00 | 12.00 |
| Wt. % Additives* | 0.43 | 0.43 | 0.43 | 0.43 | 0.43 |
| E' at 100° C. (MPa) | 604.20 | 728.70 | 700.90 | 716.90 | 705.60 |
| E' at 125° C. (MPa) | 116.80 | 229.50 | 346.40 | 457.00 | 519.40 |
| HDT @ 66 psi (° C.) | 101 | 109 | 113 | 114 | 115 |
| HDT @ 264 psi (° C.) | 78 | 84 | 87 | 85 | 79 |

TABLE VIII-continued

Examples of PBT-ionomer/polycarbonate blends

|  | R11 | E16 | E17 | E18 | E19 |
|---|---|---|---|---|---|
| NI @ 22 C. (ft.-lb./in.) | 12.7 | 12.4 | 12.0 | 10.9 | 11.6 |
| NI @ −30 C. (ft.-lb./in.) | 9.8 | 9.1 | 9.8 | 9.0 | 9.3 |
| NI @ −40 C. (ft.-lb./in.) | 9.1 | 9.0 | 8.9 | 9.9 | 9.3 |
| Tensile Elongation (%) | 152 | 145 | 141 | 144 | 141 |

*Additives — 0.20 pph Irganox 1010, 0.15 pph Irgaphos 168, 0.08 pph phosphorous acid.

Examples R12, E20–E23

In addition to enhancing the thermomechanical properties of PBT/PC blends, the incorporation of sulfonate groups in to PBT also enhances the low shear rheology (blow moldability) of PC containing blends. An important characteristic of plastic materials designed to be processed by blow molding is extensional creep since a molten, thick film of material must hang between the two halves of the mold without breaking or excessively elongating. A test developed to characterize extensional creep showed that the incorporation of sulfonate groups into PBT dramatically reduced extensional creep in PC-containing blends. The test involved extruding a strand of plastic from a capillary rheometer at 240° C., attaching a weight to the strand, and measuring the time it took for the strand to elongate a specified distance. This time was referred to as the hang time. As can be seen from Table IX, the hang times of blends containing PBT-ionomers (E20–E23) were significantly longer than the reference blend (R12) indicating better processability for the blends of the invention (E20–E23).

TABLE IX

Examples of PBT-ionomer/polycarbonate blends

|  | R12 | E20 | E21 | E22 | E23 |
|---|---|---|---|---|---|
| Wt. % PBT | 35.815 | — | — | — | — |
| Wt. % PBT-1%SO3Na (39,000 poise) | — | — | — | — | 35.815 |
| Wt. % PBT-5%SO3Na (7,000 poise) | — | 35.815 | — | — | — |
| Wt. % PBT-5%SO3Na (19,000 poise) | — | — | 35.815 | — | — |
| Wt. % PBT-5%SO3Na (28,000 poise) | — | — | — | 35.815 | — |
| Wt. % Branched PC | 48.10 | 48.10 | 48.10 | 48.10 | 48.10 |
| Wt. % MBS | 15.0 | 15.0 | 15.0 | 15.0 | 15.0 |
| Wt. % Additives* | 1.085 | 1.085 | 1.085 | 1.085 | 1.085 |
| Hang Time (sec.) | 6 | 13 | 15 | 42 | 30 |
| HDT, 264 psi (° C.) | 71 | 73 | 70 | 92 | 78 |
| HDT, 66 psi (° C.) | 102 | 106 | 106 | 107 | 110 |
| NI @ 22° C. (ft.-lb./in.) | 12.2 | 10.9 | 11.9 | 11.9 | 12.6 |
| NI @ −40° C. (ft.-lb./in.) | 8.7 | 6.9 | 8.4 | 9.1 | 10.4 |
| Biaxial Impact @ −40 C. (ft.lb.) | 36.3 | 36.2 | 35.7 | 36.6 | 39.5 |
| Tensile Elongation (%) | 20 | 23 | 29 | 25 | 45 |
| Tensile stress @ yield (psi) | 7,000 | 6,900 | 7,000 | 6,900 | 7,200 |
| Flexural Modulus (psi) | 275,800 | 272,300 | 273,400 | 272,700 | 285,700 |
| Flexural Strength (psi) | 10,100 | 10,00 | 10,000 | 9,900 | 10,500 |

*Additives — 0.60 Seenox 412S thioester, 0.20 pph PEPQ phosphonite, 0.20 pph Irganox 1076 hindered phenol, 0.05 pph 45% aq. phosphorous acid, and 0.035 pph Carbon Black-C.

What is claimed is:

1. A thermoplastic resin composition comprising (a) a metal sulfonate polyester copolymer having the formula IV:

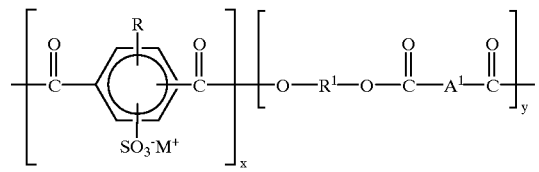

wherein the ionomer units, x, are from 0.5–50 mole percent, R is halogen, alkyl, aryl, alkylaryl or hydrogen, $R^1$ is derived from a diol reactant comprising straight chain, branched, or cycloaliphatic alkane diols and containing from 2 to 12 carbon atoms, and $A^1$ is a divalent aryl radical; and (b) an essentially amorphous polycarbonate, polyester carbonate or polyarylate polymer containing recurring units of formula II:

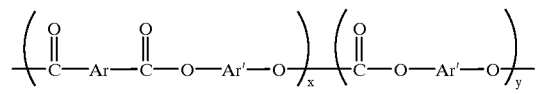

wherein Ar is a divalent aromatic residue of a dicarboxylic acid or a mixture of dicarboxylic acids and $Ar^1$ is a divalent aromatic residue of a dihydric phenol or mixture of dihydric phenols and wherein, based on mole percent, x and y may each be from 0–100 percent provided that x plus y cannot exceed 100 percent.

2. A thermoplastic resin composition of claim 1 wherein R is hydrogen, x=0.5–10 mole percent, $R^1$ is $C_2$–$C_8$ alkyl, and Al is derived from iso- or terephthalic acid or a mixture of the two.

3. A thermoplastic resin composition of claim 1 wherein the metal sulfonate polyester of formula IV is a alkylene polyester wherein $A^1$ is the residue from a diacid component of iso or tere phthalic acid and derivatives thereof and $R^1$ is the residue from a diol component selected from the group consisting of ethylene glycol, propanediol, butanediol, cyclohexanedimethanol, and derivatives thereof.

4. A thermoplastic resin composition of claim 1 where the metal sulfonate salt is iso- or tere-sulfo phthalate.

5. A thermoplastic resin composition of claim 1 wherein x=0 in formula II and said amorphous polymer (b) is a polycarbonate resin.

6. A thermoplastic resin composition of claim 1 wherein y=0 in formula II said amorphous polymer (b) is a polyarylate resin.

7. A thermoplastic resin composition of claim 1 wherein Ar of formula II is derived from the aromatic residue of isophthalic acid, terephthalic acid or a mixture thereof.

8. A thermoplastic resin composition of claim 1 where the polyester carbonate of Formula II has x in mole percent of from about 10 to about 90 and y in mole percent is from about 90 to about 10.

9. A thermoplastic resin composition of claim 1 where Ar is derived from benzene or naphthalene rings and Ar' is derived from bisphenol-A.

10. A thermoplastic resin composition of claim 1 in which the HDT at 66 psi, determined using ASTM D648, is higher than analogous materials in which the metal sulfonate copolyester polymer is replaced by an analogous polyester with no metal sulfonate groups.

11. A thermoplastic resin composition according to claim 1 further comprising (c) a quencher selected from the group consisting of phosphites having an acidic OH group, acidic phosphate salts, acidic pyrophosphates and acidic salts thereof, phosphates of Group IB and Group IIB metals, and phosphorus oxo-acids.

12. A thermoplastic resin composition of claim 1 wherein said composition further comprises a rubbery impact modifier.

13. A thermoplastic resin composition of claim 12 wherein said impact modifier is a graft copolymer comprising a rubbery substrate and a rigid polymeric graft or shell.

14. A thermoplastic resin composition of claim 1 wherein the said composition further comprises a polyolefin copolymer with glycidyl acrylate or methacrylate with from 0–80 mole % alkyl acrylate or methacrylate units.

15. A thermoplastic resin composition of claim 1 where blends further comprise non metal sulfonate polyester.

16. A thermoplastic resin composition of claim 15 where the non-sulfonate polyesters comprise PBT, PPT or PET.

17. A thermoplastic resin composition of claim 15 where the non-sulfonate polyester is about 5 to about 50 percent by weight based on weight of metal sulfonate polyester.

18. A thermoplastic resin composition of claim 1 wherein said metal sulfonate polyester (a) is in an amount from 5 to 70 weight percent based on the weight of said composition, said component (b) being present in an amount from about 5 to about 70 percent by weight, wherein said resin includes from about 0.01 to about 2 weight percent quencher and 0 to about 30 weight percent rubber modifier, and, from 0 to about 60 percent by weight filler or reinforcement.

* * * * *